June 20, 1939. W. A. VOIGT 2,163,014
METHOD OF MAKING A DENTURE
Filed April 14, 1937
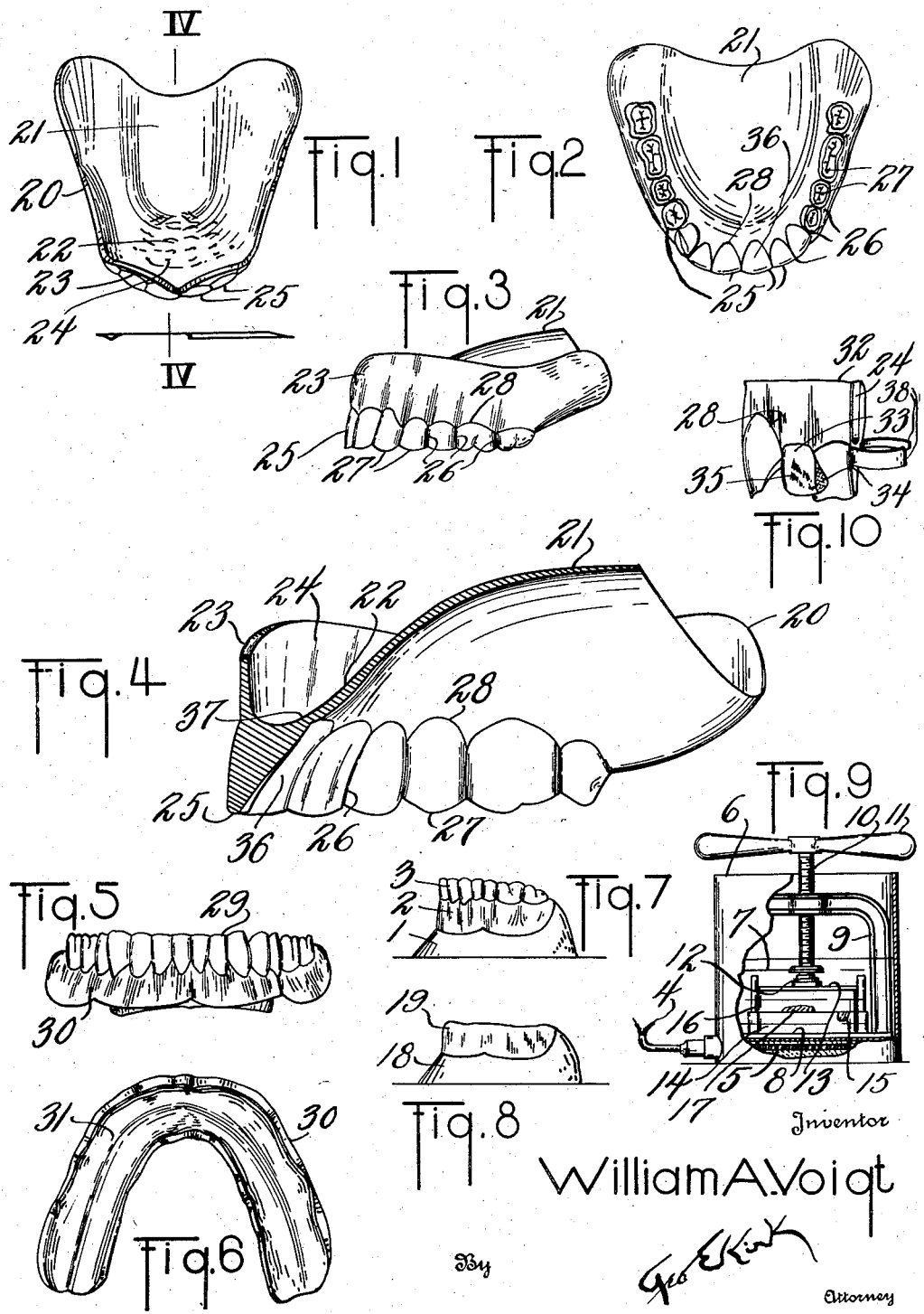
Inventor
William A. Voigt

UNITED STATES PATENT OFFICE 2,163,014

METHOD OF MAKING A DENTURE

William A. Voigt, Toledo, Ohio

Application April 14, 1937, Serial No. 136,831

1 Claim. (Cl. 32—2)

This invention relates to approaching natural efficiency and comfort forthwith and for continuing in use in the method of teeth substitution.

This invention has utility when incorporated in resilient non-metallic teeth and gum homogeneous units.

Referring to the drawing:

Fig. 1 is a plan from the jaw or upper side of an upper denture manufactured hereunder;

Fig. 2 is a bottom plan view of the denture of Fig. 1;

Fig. 3 is a side elevation from the right of Fig. 1;

Fig. 4 is a section on the line IV—IV, Fig. 1;

Fig. 5 is a front view of a denture for the complementary or lower jaw having the denture of Fig. 1;

Fig. 6 is a bottom plan view of this denture of Fig. 5;

Fig. 7 is the denture form shown as produced from an initial impression, say for the denture of Fig. 1 before extraction;

Fig. 8 is the mold form cast from an impression showing the upper jaw form after extraction;

Fig. 9 is a view, with parts broken away, of an oil press for effecting the process hereunder; and Fig. 10 is a detail of a fractional denture or minor section instead of a full plate or jaw section.

In carrying out this operation, natural developments are followed in the instance wherein an impression may be made of the condition of the patient's teeth in normal jaw assembly as before extraction. This impression upon a moldable medium, as wax, has the re-entrant form from which may be produced a special stock mold for such patient. To this end, upon base 1 (Fig. 7) there may be produced unit having gum portion 2 and teeth portion 3. With this as the form, adopted prior to extraction, the operator may reproduce in identity therewith in the instance there be no occasion for modification or correction.

In carrying out the invention herein, electric connections 4 may extend to heater 5 in vessel 6 to warm liquid as oil 7. Into this vessel may be introduced press having base 8 and riser arms 9 therefrom to mount screw stem 10, with arm 11 having compressible spring 12 for urging upper plate 13 toward complementary or opposite parallel base 8 of this press. Mounted on this base 8 is lower flask section 14 in which is mold cast form 15 from the impress effected by the mold of Fig. 7. In this operation in casting a form from the mold of Fig. 7, there may be exercised foresight for clearance, say by applying slight thickness of wax from the base portion of the teeth. The wax is applied over the entire palatal, buccal and labial portions of the model. This provides a slight lingual depth from the original palatal area and provides sufficient area for the final denture material. The wax is of course removed with the form shown in Fig. 7 and forms no part of the completed mold.

Complementary thereto is opposing flask section 16, in which is mold 17 produced from the mold of Fig. 8 comprising base 18 and gum form portion 19. There is thus provided socket bearings for the teeth back portion of the unit in lieu of cutting or whittling such out to form the plate. After lapse of time following extraction there is tendency of the gums to shrink, which receding need not be followed by the plate exterior but in providing thereby a shroud for the gum. Before bringing these flask sections 14, 16, into opposing relation, there may be introduced therebetween a sheet of the plastic or composition hereunder, which may be of approximately the jaw contour or say heart-shaped. The liquid 7 is brought up to plastic temperature for this medium and the handle 11 turned to have yieldable pressure through the spring 12 act on the section of this plastic as between the flask sections.

This pressure as effective for an interval brings the flasks into the closed position for extruding any excess of the medium or plastic and effecting a homogeneous unit product, say as denture 20 having roof mouth section 21 with its lower inner shield portion 22 for the gum, and outer shield portion 23 opposed thereto, therebetween to provide channel 24 embracing the gum or jaw portion from which extraction has occurred. From this channel portion and opposite thereto are tooth replacement projections 25 of tooth formed contour identity with that of the teeth form 3 (Fig. 7).

This tooth form is with re-entrant portions 26 between the teeth, tooth tips 27, and process or gum line 28 with the flesh-approaching region. The natural gum after extraction (Fig. 8) may have its recession not extensive relatively to the region 28. It is, accordingly, in order for the dentist or operator to create a sufficient clearance region adjacent the merging of the tooth forms to the gum shield. This is a clearance step advantageously effected as say by wax of slight thickness from the base portion of the teeth at the time of production of the mold from the impression. However, this may be relatively thin due to the fact that the teeth forms are homogeneous throughout with the channel or gum shield. This integral homogeneous character of the material is of sufficient inherent strength that there is not a thickening or reinforcement required.

For denture of less than full set of teeth or one lacking the transverse web 21, say as for a lower, there may be denture having lower set 29 (Fig. 5) with gum section 30 as a shield at a channel 31 embracing the gum.

In the carrying out of this care, the gum form adopted may be at once on extraction so that the patient does not have to undergo a period of shrinkage for the gums and the irritation from use of the mouth. This shield is a help in a sanitary way for early healing as well as immediate use of normal tooth form for mouth operations in chewing or speaking. In this conforming, in the event there may be some shrinkage after a period of time, it is only necessary to re-form the pre-cast or make a new cast of this homogeneous unit. Re-forming the pre-cast is readily possible by slight rise in temperature according to the substance of the plastic and re-shaping thereunder to conform to the required dimensional variation.

In carrying out this work, there is availing of the initial strength for the plastic throughout as a unit, and to this end its homogeneity is maintained under composition or color consistent with that for the particular teeth of the patient. These may be for a normal natural color of light ivory; for the darker standards; for the pearl gray; or for the deep yellow. In fact, full range of shades may be within the range for composition in the plastic. As to the plastics, the vulcanite or analogous substances may operate at a temperature of 320° F. However, preference hereunder is given to the cellulose products. Cellulose nitrate will operate effectively at 260° F., while cellulose acetate may run up to 325° or 370° F.; while a still higher temperature, around 600° F. is in order for methacrylates.

In this grouping there may be adopted special features of value say for acetate, of rigidity but springiness or resilience to conform to some extent to chewing operations. It maintains its form. It has a luster comparable with that of natural teeth. There is lightness of weight so that it is not a load upon the jaw. In fact, the lightness is such that it is less than for normal teeth. There is toughness against fracture greater than that of normal teeth, notwithstanding there is the luster of appearance approaching that of the natural enamel. There is a firmness or biting value in the teeth for effective chewing, notwithstanding the degree of hardness is less than that of normal teeth, and in the event normal teeth be still retained in the mouth, there is resulting less wear on the normal teeth than on these artificial or replacement sets. With this unit the gum shield section may have color value imparted thereto by surface application according to the pink or other flesh color in the mouth, thereby leaving the composition body color to be with the teeth proper throughout their wear.

In the design of the shield to the teeth natural form such may extend to the inside as well as the outer portion of the jaw. Tendency of the mouth to shrink and affect facial lines is thus reduced with the advantage for retaining natural comeliness of the individual. This adopted figuration for biting is effective in the mouth as to the teeth for maintaining tongue clearance for proper enunciation of the dental tones.

The channel or gum section as fragmentary in the jaw is shown (Fig. 10) as gum section 32 having its channel 24. In the instance herein, the mold made prior to extraction in the continuing of the production hereunder shows the minor form or unsymmetrical tooth 33 which, in lieu of gold filling, has gold colored section 34 and discolored section 35, thereby illustrating the effectiveness for retaining full and accurate reproduction for the user. This continuity of slope or bite from the tooth tip 25 along slant 36 to the region of the process is in approximation for normal tongue clearance enabling the user to enunciate and articulate even into the difficult words requiring movement of the tongue into proximity with the teeth. This end is obtained due to thin region 37 at the region of juncture which would be between the teeth and process.

This homogeneous unit, when of fractional denture form, may have channel extension beyond the tooth replacement portion to embrace the gum in a region where there is not an opposing tooth. If the unit be intermediate other teeth, there may be embracing extension fingers, leaves or arms as sort of hooks to engage the tooth side of the tooth adjacent the gum. Such extension 38 may be narrow or of width. Its color form may be of harmony with the tooth, of harmony with the gum, or of distinction therefrom. However, it is homogeneous with the unit and readily adaptable to conform for engagement should the extent of use seem to effect departure from the desired fit, say as working loose or otherwise. The portion may be warmed slightly and squeezed or stretched to adapt more snugly to the desired working relation. While the tooth replacement portions are of effective hardness for harsh chewing or masticating operation, the thinned out, curved edge portions toward the gum or around for adjacent tooth engagement is almost springing in its nature, and as so adapted nicely to fitting may be worked to avoid harshness or irritation in use.

What is claimed and it is desired to secure by Letters Patent is:

The method of forming a denture comprising the step of obtaining a first impression prior to extraction of teeth, the step of obtaining a second impression subsequent to extraction of teeth, making a positive model of the second impression, making a positive model of the first impression, placing a thin layer of wax over the palatal, labial and buccal surfaces and merging said layer with the teeth at their cervical margins, impressing said last named model in investment material to form a complementary mold cavity, and placing the second impression model in cooperative relation with the mold cavity, thereby to form a complete denture mold.

WILLIAM A. VOIGT.